US012266519B2

(12) United States Patent
Lee et al.

(10) Patent No.: US 12,266,519 B2
(45) Date of Patent: Apr. 1, 2025

(54) CARBON NANOTUBE (CNT) PASTE EMITTER, METHOD OF MANUFACTURING THE SAME, AND X-RAY TUBE APPARATUS USING THE SAME

(71) Applicant: Korea University Research and Business Foundation, Seoul (KR)

(72) Inventors: Cheol Jin Lee, Seoul (KR); Han Bin Go, Seongnam-si (KR); Sang Heon Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 306 days.

(21) Appl. No.: 17/853,124

(22) Filed: Jun. 29, 2022

(65) Prior Publication Data

US 2022/0399177 A1 Dec. 15, 2022

Related U.S. Application Data

(63) Continuation of application No. PCT/KR2020/006518, filed on May 19, 2020.

(30) Foreign Application Priority Data

Dec. 30, 2019 (KR) ........................ 10-2019-0178646
Mar. 20, 2020 (KR) ........................ 10-2020-0034214

(51) Int. Cl.
*H01J 9/02* (2006.01)
*H01J 35/06* (2006.01)

(52) U.S. Cl.
CPC ............ *H01J 9/025* (2013.01); *H01J 35/065* (2013.01); *H01J 2201/30469* (2013.01)

(58) Field of Classification Search
CPC ..................... H01J 9/025; H01J 35/065; H01J 2201/30469; H01J 1/3042; H01J 1/304;
(Continued)

(56) References Cited

U.S. PATENT DOCUMENTS

2007/0267955 A1 11/2007 Yaniv et al.
2008/0299298 A1 12/2008 Kim et al.
(Continued)

FOREIGN PATENT DOCUMENTS

JP 2005-353444 A 12/2005
KR 10-2006-0096561 A 9/2006
(Continued)

OTHER PUBLICATIONS

International Search Report issued on Aug. 31, 2020 for PCT/KR2020/006518 (3 pages in English).
(Continued)

*Primary Examiner* — Irakli Kiknadze
(74) *Attorney, Agent, or Firm* — NSIP Law

(57) ABSTRACT

A method of manufacturing a CNT paste emitter in accordance with an exemplary embodiment of the present disclosure includes a process of mixing first CNT powder, graphite nanoparticles, SiC nanoparticles, Ni nanoparticles, a dispersant and distilled water and then performing a dispersion process by means of ultrasonication, a process of acquiring second CNT powder by filtering a solution dispersed during the dispersion process, a process of mixing the second CNT powder with a graphite binder and then preparing a CNT paste by means of ball milling, and a process of forming an interface layer on a metal or graphite substrate and then bonding the CNT paste.

4 Claims, 11 Drawing Sheets

(58) Field of Classification Search

CPC ..................... H01J 1/3044; H01J 29/04; H01J 2201/30492; H01J 2201/30461; H01J 2201/30449; H01J 2201/30446; H01J 2201/30434; H01J 2201/30403; H01J 2201/30488; H01J 31/127; H01J 2235/062; H01J 2209/0223; H01J 35/13; H01J 35/14; H01J 35/186; H01J 2235/1204; H01J 19/38; H01J 35/147; H01J 2235/06; H01J 35/16; H01J 35/045; H01J 35/064; H01J 2235/16; H01J 35/20; H01J 35/32; H01J 35/101; H01J 9/39; H01J 2235/205; H01J 35/06; H01J 35/08; B01F 11/02; C01B 32/20; C01B 32/168; C01B 32/15; B82Y 40/00; C01G 55/00; H05G 1/025; H05G 1/32; H05G 1/52; G21K 1/02; G01N 23/046; G21G 4/04

USPC ......................... 378/119, 123, 136–138, 140

See application file for complete search history.

(56) References Cited

U.S. PATENT DOCUMENTS

| | | | | |
|---|---|---|---|---|
| 2009/0185660 | A1* | 7/2009 | Zou | H01J 1/3048 378/138 |
| 2012/0308716 | A1* | 12/2012 | Jeong | B82Y 40/00 977/939 |
| 2015/0332887 | A1* | 11/2015 | Park | H01J 35/04 378/122 |
| 2017/0148607 | A1* | 5/2017 | Wang | H01J 9/39 |
| 2018/0190466 | A1* | 7/2018 | Park | H01J 19/38 |
| 2018/0247787 | A1* | 8/2018 | Jeong | H01J 35/045 |
| 2021/0272766 | A1* | 9/2021 | Lee | H01J 35/13 |

FOREIGN PATENT DOCUMENTS

| | | | |
|---|---|---|---|
| KR | 10-2011-0118070 | A | 10/2011 |
| KR | 10-2014-0050540 | A | 4/2014 |
| KR | 10-2016-0109154 | A | 9/2016 |
| KR | 10-2017-0005417 | A | 1/2017 |
| KR | 10-1700810 | B1 | 1/2017 |
| KR | 10-2017-0089387 | A | 8/2017 |
| KR | 10-2019-0014636 | A | 2/2019 |
| KR | 10-2019-0033669 | A | 4/2019 |
| KR | 10-2019-0114732 | A | 10/2019 |

OTHER PUBLICATIONS

Wang, Chao, et al. "Improved Field Emission Property of ZnO/CNTs Composites by Adding a Graphene Resistive Layer." IVEC 2012. IEEE, 2012., (2 pages).

Sun, Yuning, et al. "High-performance field emission of carbon nanotube paste emitters fabricated using graphite nanopowder filler." Nanotechnology 28.6 (2017): 065201., (10 pages).

Jiang, Ruirui, et al. "Enhanced field electron emission of single-walled carbon nanotubes prepared by imprinting technique." Journal of Alloys and compounds 816 (2020): 152669., (9 pages).

Partial supplementary European search report issued on Jul. 22, 2024, in counterpart European Patent Application No. 20909681.7 (18 pages).

Extended European search report issued on Oct. 15, 2024, in counterpart European Patent Application No. 20909681.7 (16 pages).

* cited by examiner

↑ I-V Curve

↑ Long-term Stability

↑ I-V Curve

↑ Long-term Stability

CARBON NANOTUBE (CNT) PASTE EMITTER, METHOD OF MANUFACTURING THE SAME, AND X-RAY TUBE APPARATUS USING THE SAME

CROSS-REFERENCE TO RELATED APPLICATIONS

Pursuant to 35 USC 120 and 365(c), this application is a continuation of International Application No. PCT/KR2020/006518 filed on May 19, 2020, and claims the benefit under 35 USC 119(a) of Korean Patent Application No. 10-2019-0178646 filed on Dec. 30, 2019, and Korean Patent Application 10-2020-0034214 filed on Mar. 20, 2020, in the Korean Intellectual Property Office, the entire disclosures of which are incorporated herein by reference for all purposes.

TECHNICAL FIELD

The present disclosure relates to a carbon nanotube (CNT) paste emitter based on a graphite material, a method of manufacturing the same, and an X-ray tube apparatus using the same.

BACKGROUND

In general, a CNT paste emitter is manufactured by mixing CNTs that emit electrons, a filler that disperses and fixes the CNTs and a binder that bonds the CNTs and the filler to a substrate to form a paste, and then attaching the CNT paste on the substrate.

The binder used in this case is generally composed of conductive particles and a solvent. The solvent is removed through a heat treatment during manufacturing of a paste field electron emitter, and only the conductive particles finally remain inside the CNT paste to serve as a bonding and electrical pathway. For example, a conventional CNT paste is prepared using an ethyl cellulose (EC) binder composed of EC particles and a terpineol solvent.

However, the EC binder used in manufacturing of the conventional CNT paste has poor electrical conductivity. Specifically, the EC binder is composed of EC particles and a terpineol solvent. The EC particles are polymer particles of several micrometers in size and has an electrical conductivity of about 1 $s \cdot m^{-1}$ or less which is much lower than about 107 $s \cdot m^{-1}$ for copper.

Therefore, if the CNT paste is prepared using the EC particles, the bulk resistance of the paste is increased. When the bulk resistance of the paste is increased, the mobility of electrons in the paste is greatly decreased. Thus, the performance and efficiency of field electron emission may be degraded. Further, high bulk resistance inside the paste causes the generation of high Joule heat in the paste when the field electron emitter is operated. In that case, EC, which is an organic polymer material having poor thermal stability, thermally decomposes and outgassing occurs from the organic polymer material. Such outgassing eventually lowers the degree of vacuum inside the vacuum tube and thus shortens the life of the field electron emitter.

In order to solve this problem, there is a need for a CNT paste field electron emitter manufactured using a graphite binder having excellent electrical conductivity. Also, in order to manufacture a CNT paste field electron emitter having excellent and stable electrical conductivity, a dispersion process for evenly mixing CNTs, filler particles and a binder inside a CNT paste is essential. A conventional CNT paste field electron emitter performs the dispersion process only by means of ball milling using zirconia balls.

In this regard, Korean Patent No. 10-1700810 (entitled "Electron emitting device using graphite binder material and manufacturing method for the same") discloses a method, including: a process of mixing and dispersing a nanomaterial for electron emission and a graphite binder material in a solvent; a process of drying the mixed and dispersed solution in which the nanomaterial and the graphite binder material are mixed; and a process of preparing a paste by mixing a binder with the dried mixture, and the graphite binder material is formed as ball-shaped graphite nanoparticles having a size of about 200 nm to 500 nm or graphite nanoplatelets.

However, the conventional electron emitting device using the graphite binder material has poor dispersibility of CNTs inside the paste and relatively weak adhesiveness between a metal or graphite substrate as a cathode electrode and the CNT paste. In other words, if the CNTs are not properly dispersed in the paste, the level of current emitted from a single CNT increases. As a result, the current load applied to the CNT increases, the electron emission from the CNTs becomes unstable, and the CNTs are easily degraded. Also, the graphite nanoparticles having an average diameter of about 200 nm cannot form a strong mechanical adhesion with the metal or graphite substrate serving as the cathode electrode. Accordingly, when the CNT paste field electron emitter is operated under a high electric field or high current condition, the CNT paste may be detached from the substrate and may cause electrical arcing in the electron emitting device.

DISCLOSURE OF THE INVENTION

Problems to be Solved by the Invention

The present disclosure is conceived to solve the above-described problem, and an exemplary embodiment of the present disclosure provides a method of preparing a CNT paste including second CNT powder composed of first CNT power, graphite nanoparticles, SiC nanoparticles and Ni nanoparticles, and a graphite binder to improve the stability of a CNT paste emitter serving as a field electron emitter.

Also, an exemplary embodiment of the present disclosure provides a method of manufacturing a CNT paste emitter in which an interface layer is inserted between the CNT paste emitter and a metal or graphite substrate to reduce an electrical contact resistance between the CNT paste emitter and a cathode electrode.

Further, an exemplary embodiment of the present disclosure provides an X-ray tube apparatus which uses a gate electrode coupled to a graphene thin film on its lower or upper surface and includes a CNT paste emitter and an elliptical electron beam focusing lens to improve the transmission linearity of electron beam.

However, the problems to be solved by the present disclosure are not limited to the above-described problems. There may be other problems to be solved by the present disclosure.

Means for Solving the Problems

As a technical means for solving the above-described problem, a method of preparing a CNT paste in accordance with an exemplary embodiment of the present disclosure includes a process of mixing CNT powder, graphite nanoparticles, a dispersant and distilled water and then performing a dispersion process by means of ultrasonication, and a process of mixing a solution dispersed during the dispersion process with a graphite binder and then preparing a CNT paste by means of ball milling.

The method of preparing a CNT paste includes a process of mixing first CNT powder, graphite nanoparticles, SiC nanoparticles, Ni nanoparticles, a dispersant and distilled water and then performing a dispersion process by means of ultrasonication, a process of acquiring second CNT powder by filtering a solution dispersed during the dispersion process, and a process of mixing the second CNT powder with a graphite binder and then preparing a CNT paste by means of ball milling.

The process of acquiring the second CNT powder includes a process of filtering the first CNT powder on a poly-tetra fluoroethylene (PTFE) membrane by means of vacuum filtration and drying it in the form of a film, and in the second CNT powder, the first CNT powder, the graphite nanoparticles, the SiC nanoparticles and the Ni nanoparticles are evenly dispersed.

The CNT paste is formed into a circular or rod-shaped thin film and arranged in a single type or an array type.

The process of preparing the CNT paste includes a process of performing the ball milling for 10 minutes or less.

A method of manufacturing a CNT paste emitter in accordance with an exemplary embodiment of the present disclosure includes a process of providing a metal or graphite substrate including an interface layer stacked on its upper surface, a process of compressing a CNT paste against the metal or graphite substrate by means of screen printing, a process of performing a firing process, and a process of performing a surface treatment to a surface of the CNT paste on which the firing process has been completed.

The CNT paste includes second CNT powder and a graphite binder, and the second CNT powder includes first CNT powder, graphite nanoparticles, SiC nanoparticles and Ni nanoparticles.

The process of providing the substrate including the interface layer stacked on its upper surface includes a process of synthesizing graphene on a copper foil by means of CVD, a process of coating a PMMA thin film on the graphene, a process of removing the copper foil using an etching solution, a process of transferring the graphene, from which the copper foil has been removed, to the substrate, and a process of removing the PMMA thin film after the transfer process is completed.

The process of compressing the CNT paste against the substrate includes a process of fixing a mask having one or more patterns on the substrate, and a process of placing the CNT paste on the mask and forming the CNT paste emitter corresponding to the pattern on the substrate while repeatedly compressing the CNT paste against the substrate using a squeegee.

The process of performing the firing process includes a process of performing a first heat treatment in an atmospheric atmosphere and a second heat treatment in a vacuum atmosphere, and the Ni nanoparticles in the CNT paste are present in a molten state inside the CNT paste and at an interface between the paste and the substrate by the heat treatments.

An X-ray tube apparatus using a CNT paste emitter in accordance with an exemplary embodiment of the present disclosure includes a cathode electrode coupled to a CNT paste emitter, a gate electrode disposed above the cathode electrode, having a hole greater in size than the CNT paste emitter and coupled to a graphene thin film on its lower or upper surface, a focusing lens disposed above the gate electrode, an anode electrode disposed above the focusing lens to face the cathode electrode, and a tube housing surrounding the cathode electrode, the gate electrode, the focusing lens and the anode electrode. The cathode electrode includes a metal substrate, a CNT paste emitter disposed on the metal substrate and an interface layer inserted between the metal substrate and the CNT paste emitter. The interface layer is graphene or a graphite thin film.

The CNT paste emitter includes second CNT powder and a graphite binder, and the second CNT powder includes first CNT powder, graphite nanoparticles, SiC nanoparticles and Ni nanoparticles.

The focusing lens has an elliptical structure.

The gate electrode is formed by a process of synthesizing graphene on a copper foil by means of CVD, a process of coating a PMMA thin film on the graphene, a process of removing the copper foil using an etching solution, a process of transferring the graphene, from which the copper foil has been removed, to the metal substrate having the hole, and a process of removing the PMMA thin film after the transfer process is completed.

Effects of the Invention

According to the above-described means for solving the problem, a CNT paste is prepared from a graphite binder using graphite nanoparticles, which are an inorganic material having excellent conductivity and excellent thermal stability, instead of an EC binder using EC particles, which are an organic polymer material. Therefore, it is possible to solve the problems of the conventional EC binder. That is, since the graphite nanoparticles have high thermal stability unlike EC, which is a polymer material, high Joule heat is not generated during high current operation and the occurrence of outgassing is greatly suppressed. Accordingly, it is possible to suppress shortening of the life of a field electron emitting device.

Further, according to the present disclosure, it is possible to improve the dispersibility of CNTs inside the CNT paste by adding SiC nanoparticles (about 50 nm in size) in addition to the graphite nanoparticles (about 200 nm in size). That is, if the SiC nanoparticles of about 50 nm in size are used as a filler to improve the dispersibility of CNTs, the uniformity in electron emission and the total level of emission current can be improved and the current load applied to the CNTs in the CNT paste emitter can be reduced. Accordingly, it is possible to manufacture a CNT paste emitter which can be stably operated.

Furthermore, according to the present disclosure, it is possible to improve the adhesiveness of the CNTs in the CNT paste by adding Ni nanoparticles (about 30 nm in size) in addition to the graphite nanoparticles (about 200 nm in size). It is also possible to improve the mechanical adhesiveness between the CNT paste emitter and a substrate (cathode electrode). That is, by using the Ni nanoparticles of about 30 nm in size as a filler, it is possible to manufacture a field electron emitting device which can be stably operated under a high electric field or high current condition without detachment of the CNT paste emitter.

According to the present disclosure, a field electron emitting device with improved field electron emission characteristics can be manufactured by inserting an interface layer made of graphene or graphite thin film between the cathode electrode made of a metal or graphite material and the CNT paste emitter to improve the mechanical adhesiveness and reduce the electrical contact resistance between the cathode electrode and the CNT paste emitter.

BRIEF DESCRIPTION OF THE DRAWINGS

FIG. 1A illustrates a single type CNT paste emitter and FIG. 1B illustrates an array type CNT paste emitter.

FIG. 2A is a scanning electron microscope (SEM) image of the CNT paste emitter and FIG. 2B is a high-magnification SEM image showing the surface of the CNT paste emitter.

FIG. 6A shows a current-voltage characteristic curve (I-V curve) for comparison by measuring a CNT paste (only BM) prepared only by means of conventional ball milling and a CNT paste (TS+BM) prepared by performing ultrasonication before ball milling according to the present disclosure and FIG. 6B shows the result of measuring long-term emission stability.

FIG. 8A shows a current-voltage characteristic curve (I-V curve) for comparison by measuring a CNT paste emitter (W/O graphene) without applying an interface layer to a CNT paste prepared according to the present disclosure and a CNT paste emitter (Graphene) in which an interface layer is inserted and FIG. 8B shows the result of measuring long-term emission stability.

FIG. 10A illustrates a process of transferring graphene coated with a PMMA thin film to a metal substrate having a hole and FIG. 10B shows a state where the PMMA thin film has been removed and only the graphene remains on the substrate.

BEST MODE FOR CARRYING OUT THE INVENTION

Figure 1A:
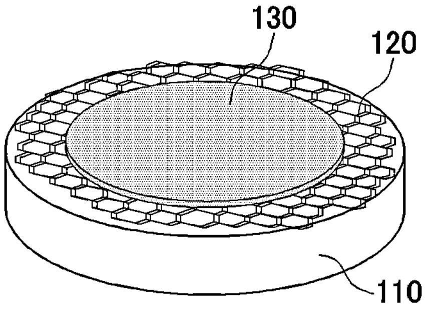
FIGS. 1A and 1B are example depictions to explain structures of CNT paste emitters in accordance with exemplary embodiments of the present disclosure.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Figure 1B:
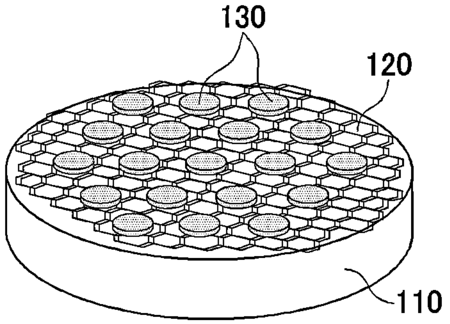

FIGS. 1A and 1B are example depictions to explain structures of CNT paste emitters in accordance with exemplary embodiments of the present disclosure. FIG. 1A illustrates a single type CNT paste emitter and FIG. 1B illustrates an array type CNT paste emitter. Herein, a CNT paste may be formed into a circular or rod-shaped thin film and arranged in a single type or an array type.

Referring to FIGS. 1A and 1B, the present disclosure includes a metal or graphite substrate 110 serving as a cathode electrode, a CNT paste emitter 130 disposed on the substrate 110 and including second CNT powder and a graphite binder and an interface layer 120 inserted between the substrate 110 and the CNT paste emitter 130. Herein, the interface layer 120 is graphene or a graphite thin film, and the second CNT powder includes first CNT powder, graphite nanoparticles, SiC nanoparticles and Ni nanoparticles.

Figure 2A:
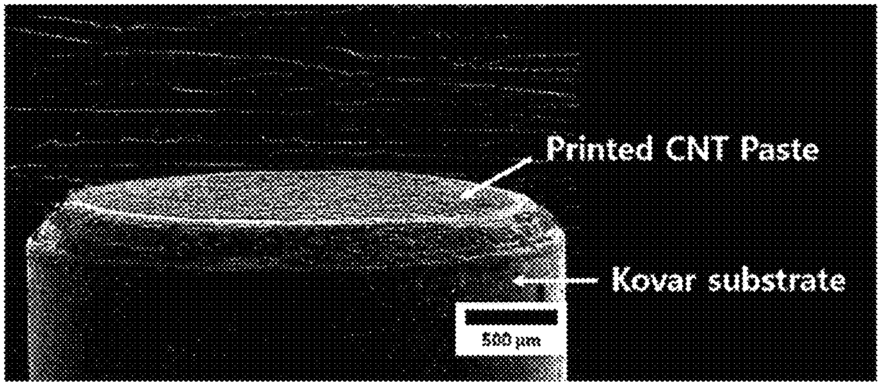
FIGS. 2A and 2B show a CNT paste emitter analyzed by scanning electron microscopy (SEM) in accordance with an exemplary embodiment of the present disclosure.
Figure 2B:
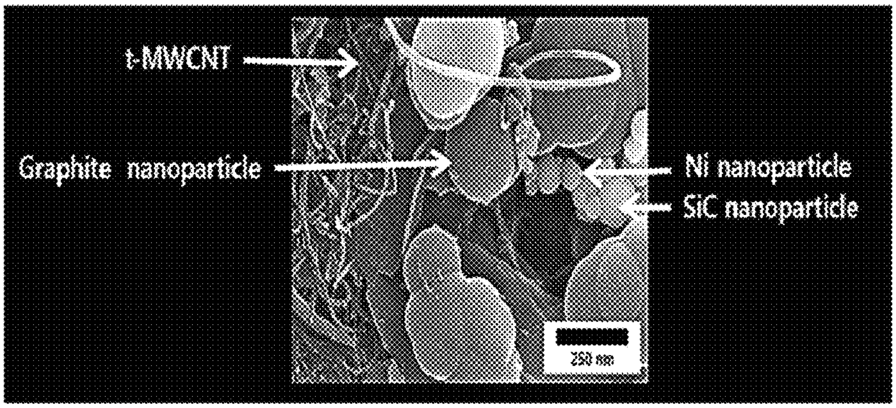

FIG. 2 shows a CNT paste emitter analyzed by scanning electron microscopy (SEM) in accordance with an exemplary embodiment of the present disclosure. FIG. 2A is a scanning electron microscope (SEM) image of the CNT paste emitter and FIG. 2B is a high-magnification SEM image showing the surface of the CNT paste emitter.

Referring to FIG. 2A, it can be seen that the CNT paste is uniformly applied on the substrate 110. Referring to FIG. 2B, thin multi-walled carbon nanotubes (t-MWCNTs), which are a material emitting electrons on the surface of the CNT paste, are formed into a tip shape suitable for field emission and partially distributed among various fillers (graphite nanoparticles, SiC nanoparticles, Ni nanoparticles).

Figure 3:
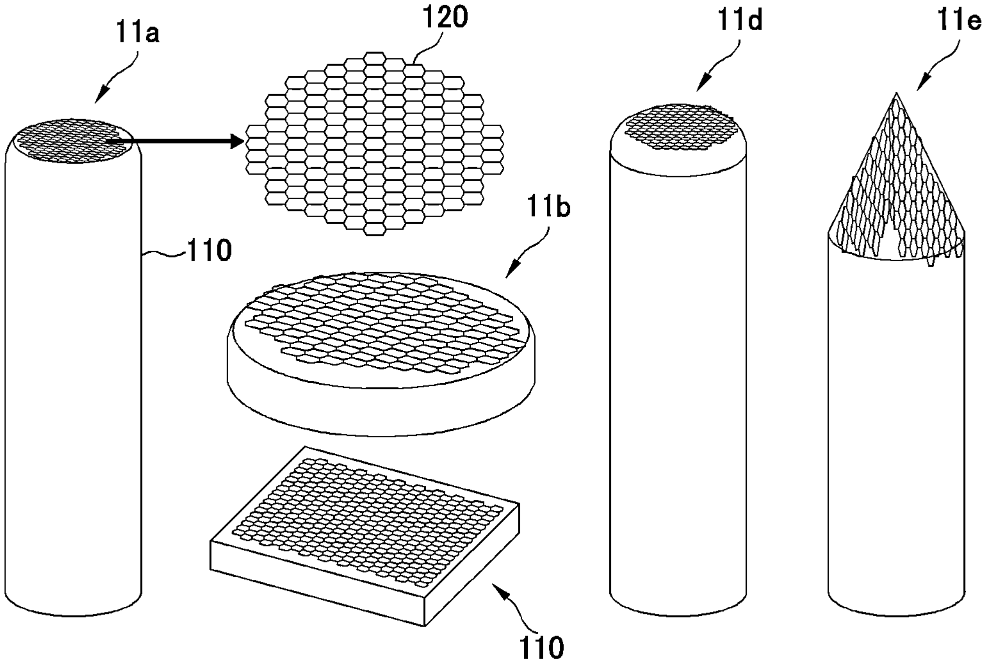
FIG. 3 illustrates various types of metal substrates to which graphene is attached in order to apply the CNT paste emitter in accordance with an exemplary embodiment of the present disclosure to a cathode electrode.

FIG. 3 illustrates various types of metal substrates to which graphene is attached in order to apply the CNT paste emitter to a cathode electrode in accordance with an exemplary embodiment of the present disclosure.

For example, referring to FIG. 3, cathode electrodes 11*a* to 11*e* may be formed as metal rods, graphite rods, metal substrate or graphite substrates 110 of various shapes. Herein, the metal rods or the metal substrates 110 are preferably made of kovar or stainless steel (SUS). Also, the graphene 120, which is a nanomaterial, may be transferred onto the substrate 110 and the CNT paste may be applied onto the graphene 120 to manufacture the CNT paste emitter which can be applied to a cold cathode X-ray tube apparatus for various purposes. For example, if the cathode electrodes 11*a*, 11*d*, and 11*e* are formed into a rod shape, the upper surfaces thereof may be formed into a circular or conical shape and the graphene 120 may be formed to cover the circular or conical shape. As another example, if the cathode electrodes 11*b* and 11*c* are formed into a substrate shape, the upper surfaces thereof may be formed into a circular or rectangular shape and the graphene 120 may be formed to cover the circular or rectangular shape.

Figure 4A:
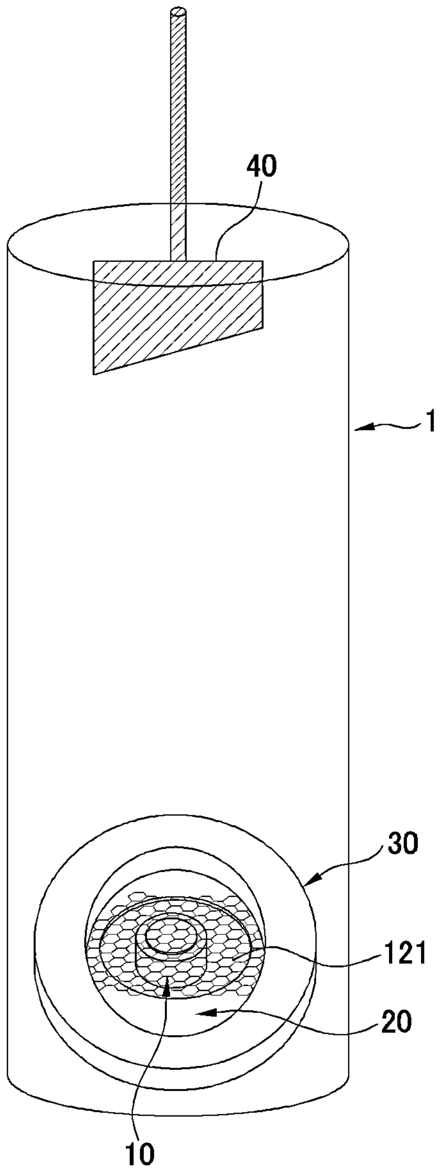
FIG. 4A is an example depiction to explain an X-ray tube apparatus in accordance with an exemplary embodiment of the present disclosure.

FIG. 4A is an example depiction to explain an X-ray tube apparatus in accordance with an exemplary embodiment of the present disclosure.

Figure 4B:
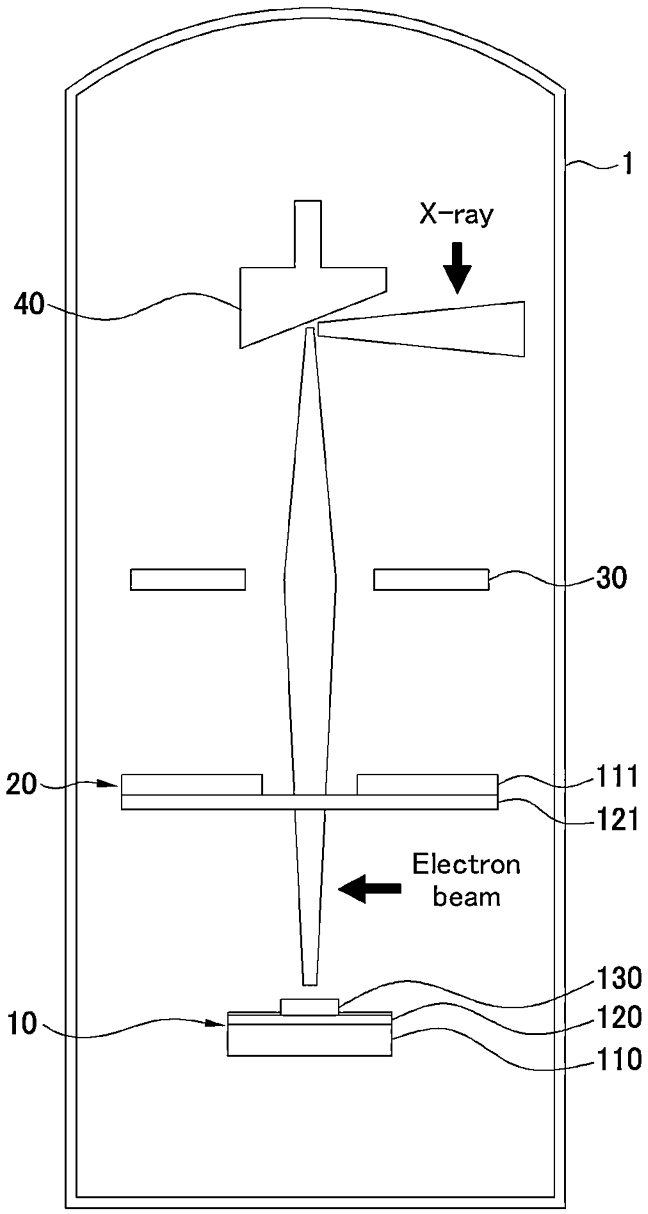
FIG. 4B is a cross-sectional view of the X-ray tube apparatus in accordance with an exemplary embodiment of the present disclosure.

FIG. 4B is a cross-sectional view of the X-ray tube apparatus in accordance with an exemplary embodiment of the present disclosure.

Referring to FIG. 4A, the X-ray tube apparatus using the CNT paste emitter includes a cathode electrode 10 coupled to the CNT paste emitter, a gate electrode 20 disposed above the cathode electrode 10, having a hole greater in size than the CNT paste emitter 130 and coupled to a graphene thin film 121 on its lower or upper surface, a focusing lens 30 disposed above the gate electrode 20, an anode electrode 40 disposed above the focusing lens 30 to face the cathode electrode 10, and a tube housing 1 surrounding the cathode electrode 10, the gate electrode 20, the focusing lens 30 and the anode electrode 40. Herein, as illustrated in FIG. 1A and FIG. 1B, the cathode electrode 10 includes the CNT paste emitter 130 disposed on the substrate 110 and including the second CNT powder and the graphite binder, and the interface layer 120 inserted between the substrate 110 and the CNT paste emitter 130.

The interface layer 120 is graphene or a graphite thin film, and the second CNT powder includes first CNT powder, graphite nanoparticles, SiC nanoparticles and Ni nanoparticles.

As illustrated in FIG. 4A, the focusing lens 30 may have an elliptical structure. For example, the focusing lens 30 may have an elliptical structure suitable for the shape of an electron beam emitted from the CNT paste emitter. The focusing lens having an elliptical structure can have a small size electron beam focus on the surface of the anode electrode compared with a focusing lens having a circular structure, and, thus, the resolution for X-rays can be greatly improved.

For example, in the X-ray tube apparatus of the present disclosure, when electrons emitted from the CNT paste emitter collide with a target surface of the anode electrode 40 due to a voltage difference between the cathode electrode 10 and the anode electrode 40, an X-ray generated from the target is discharged to the outside of the X-ray tube through a side surface of the tube housing 1 made of glass or ceramic.

For example, referring to FIG. 4B, the tube housing 1 forms the exterior of the X-ray tube apparatus, and a side surface of the tube may have a beryllium window through which an X-ray emitted from the target surface of the anode electrode 40 is irradiated to the outside. The housing 1 of the X-ray tube includes the metal or graphite substrate 110 serving as the cathode electrode 10, the interface layer 120, the CNT paste emitter 130, the anode electrode 40 and a metal substrate 111 having a hole wider than the CNT paste emitter 130, and defines a vacuum area separated from the outside by surrounding an outer surface of the gate electrode 20 in which the graphene 121 is disposed on a lower surface of the metal substrate 111.

Further, the cathode electrode 10 and the anode electrode 40 are arranged to face each other, and the anode electrode 40 may be arranged above the cathode electrode 10 at a predetermined distance from the cathode electrode 10. A lower surface of the anode electrode 40, i.e., a surface facing the cathode electrode 10, may be slanted at a predetermined angle.

The anode electrode 40 may have one surface facing the inside of the body as a target surface with which electrons emitted from the CNT paste emitter 130 collide.

The substrate 110 serves as the cathode electrode 10, and the interface layer 120 and the CNT paste emitter 130 are formed thereon.

The gate electrode 20 is positioned above the cathode electrode 10 and may include the metal substrate 111 having an opening (e.g., in the form of a hole) at a position corresponding to the CNT paste emitter 130. Further, if the array type CNT paste emitter 130 is formed on the cathode electrode 10, the metal substrate 111 of the gate electrode 20 may include a plurality of openings (e.g., arranged at a predetermined distance).

Preferably, the gate electrode 20 of the present disclosure includes the metal substrate 111 having a hole greater in size than the CNT paste emitter 130 and the graphene 121 formed under the metal substrate 111. That is, with the gate electrode 20 in which the graphene 121 is disposed, it is possible to improve the transmittance of electron beam through the gate electrode 20 and the linearity of electron beam. Therefore, it is possible to increase the electron beam focusing effect in the anode electrode 40 and improve the uniformity of electron beam density.

Hereinafter, a method of preparing a CNT paste of the present disclosure and a method of manufacturing a CNT paste emitter using the same will be described in detail. A detailed description of components identical in function to those described above will be omitted.

Figure 5:
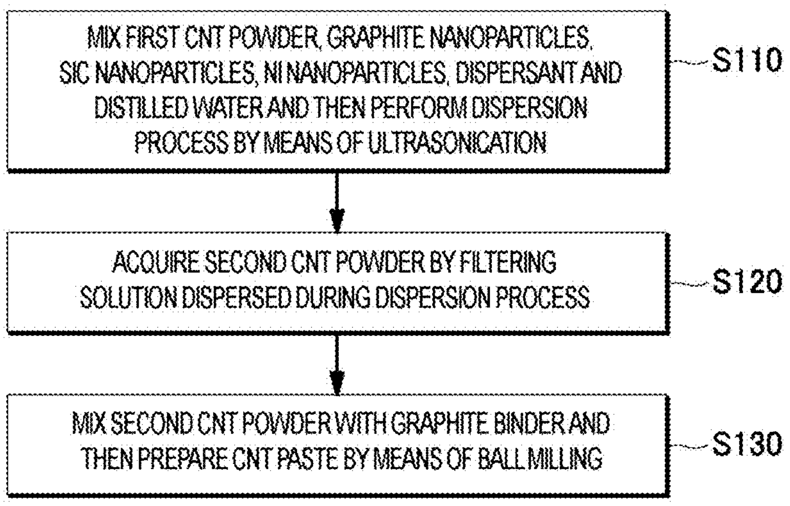
FIG. 5 is a flowchart provided to explain a method of preparing a CNT paste in accordance with an exemplary embodiment of the present disclosure.

FIG. 5 is a flowchart provided to explain a method of preparing a CNT paste in accordance with an exemplary embodiment of the present disclosure.

Referring to FIG. 5, a method of preparing a CNT paste in accordance with an exemplary embodiment of the present disclosure includes a process (S110) of mixing first CNT powder, graphite nanoparticles, SiC nanoparticles, Ni nanoparticles, a dispersant and distilled water and then performing a dispersion process by means of ultrasonication, a process (s120) of acquiring second CNT powder by filtering a solution dispersed during the dispersion process, and a process (S130) of mixing the second CNT powder with a graphite binder and then preparing a CNT paste by means of ball milling.

For example, the graphite binder, which is a mixture of the graphite nanoparticles and the binder, has excellent electrical conductivity and high thermal stability. Specifically, the electrical conductivity of the graphite particles is about 10,000 $s \cdot m^{-1}$ or more, which is $10^4$ times higher than the electrical conductivity of EC particles. Therefore, when the CNT paste is prepared, electrons can smoothly move inside the paste, which enables efficient operation of the field electron emitting device. Further, when the field electron emitting device operates, very low Joule heat is generated due to a low bulk resistance inside the paste.

For example, in the process S110, the dispersibility of CNTs inside the paste may be improved by adding SiC nanoparticles (about 50 nm in size).

Specifically, if the SiC nanoparticles are added when the CNT paste is prepared, the SiC nanoparticles are intercalated between the first CNT powder and the graphite nanoparticles. Therefore, the CNTs, which are a field electron emission material, can be more evenly distributed inside the paste. That is, if the CNT paste in which the CNTs are evenly distributed is used as a field electron emission source, the emission current value may be increased and the uniformity in generation of electron beams may be improved. Also, electrons are emitted from a number of CNTs. Therefore, when the same emission current value is set, the level of current emitted from a single CNT can be reduced. As a result, the current load applied to the CNT decreases, and, thus, stable long-term emission from the CNT is possible.

In other words, if the SiC nanoparticles of about 50 nm in size are used as a filler to improve the dispersibility of CNTs, the uniformity in electron emission and total level of emission current can be improved. Also, since the current load applied to the CNTs is reduced, it is possible to manufacture a CNT paste emitter which can be stably operated for a long time.

In addition, in the process S110, the adhesiveness of the CNTs inside the paste may be improved by adding Ni nanoparticles (30 nm in size).

Specifically, if the Ni nanoparticles are added when the CNT paste is prepared, the Ni nanoparticles are intercalated between the first CNT powder, the graphite nanoparticles or the SiC nanoparticles. Since most of these Ni nanoparticles are melted in a high-temperature heat treatment, the mechanical adhesion between the first CNT powder and the fillers (graphite nanoparticles and SiC nanoparticles) inside the paste is increased.

Further, in the process S110, $SiO_2$ nanoparticles and $TiO_2$ nanoparticles may be further included as fillers in addition to the SiC nanoparticles and the Ni nanoparticles. If the $SiO_2$ nanoparticles and $TiO_2$ nanoparticles are added, the dispersibility of the first CNT powder inside the paste may be improved.

Meanwhile, during the high-temperature heat treatment described below, some of the Ni nanoparticles present in a molten state inside the paste move to the interface between the CNT paste emitter and the metal substrate (cathode electrode). When the temperature decreases after the heat treatment is finished, the Ni nanoparticles melted at the interface are hardened again. Thus, a strong adhesion is formed between the CNT paste emitter and the metal substrate (cathode electrode). As a result, a strong mechanical adhesion and a low electrical contact resistance are formed between the metal substrate and the CNT paste emitter.

That is, by using the Ni nanoparticles of about 30 nm in size as a filler, it is possible to efficiently suppress detachment of the CNT paste from the metal substrate (cathode electrode). Therefore, it is possible to manufacture a CNT paste emitter which can be stably operated under a high electric field or high current condition.

For example, in the process S110, the first CNT powder, the graphite nanoparticles, the SiC nanoparticles, the Ni nanoparticles, the dispersant sodium dodecyl sulfate (SDS) and the distilled water (DI water) are mixed and then dispersed for about 1 hour by means of ultrasonication, and, thus, the particles may be evenly dispersed in the DI water. For example, if the dispersion process is performed by means of ultrasonication, it is preferable to perform tip sonication. In the tip sonication, a sonicator tip is immersed into the solution in which the first CNT powder, the graphite nanoparticles, the SiC nanoparticles, the Ni nanoparticles, the dispersant and the DI water are mixed to generate strong ultrasonic waves. Therefore, it is possible to greatly increase the dispersive energy efficiency.

In the process S120, when the dispersed solution is filtered on a on a poly-tetra fluoroethylene (PTFE) membrane by means of vacuum filtration, it is possible to obtain second CNT powder in which the first CNT powder, the graphite nanoparticles, the SiC nanoparticles and the Ni nanoparticles are evenly dispersed.

In the process S130, the second CNT powder and the graphite binder (a mixture of graphite nanoparticles and an adhesive material) may be mixed together, and then the second CNT powder and the graphite binder may be mixed well by means of ball milling (3 mm zirconia balls, 2,000 rpm, 10 min) to prepare the CNT paste. For example, the ball milling may be performed at a rotation speed of 2,000 rpm for a rotation time of 10 minutes or less by using zirconia balls of 3 mm in size. That is, when the CNT paste of the present disclosure is prepared, the second CNT powder, which is already evenly dispersed by means of ultrasonication, is mixed with the graphite binder by means of ball milling, and, thus, it is possible to reduce a rotation time for the ball milling.

Meanwhile, when a general conventional CNT paste is prepared, each of first ball milling for mixing CNTs with fillers and second ball billing for mixing the CNT mixture with a binder may be performed for 20 minutes or more. That is, due to mechanical friction between the CNTs and zirconia balls during the entire ball milling process for 40 minutes or more, the CNTs may be seriously damaged. However, when the CNT paste of the present disclosure is prepared, ball milling of 10 minutes or less is performed to the graphite binder and the second CNT powder, which is evenly dispersed by means of ultrasonication Therefore, damage to the CNTs can be significantly reduced.

According to the method of the present disclosure unlike the conventional method of preparing a CNT paste by which CNTs are dispersed only by means of ball milling or ultrasonication, a dispersion process is firstly performed by means of tip sonication and then a dispersion process is secondarily performed by means of ball milling for 10 minutes or less. Therefore, the CNT powder and the filler materials (graphite nanoparticles, SiC nanoparticles and Ni nanoparticles) can be evenly dispersed without mechanically damaging the CNTs present inside the CNT paste.

For this reason, in the CNT paste of the present disclosure, the CNT powder and the filler materials (graphite nanoparticles, SiC nanoparticles and Ni nanoparticles) are very evenly dispersed throughout the paste. Therefore, field electron emission uniformly occurs not in a specific part but in all parts of the CNT paste, and, thus, the performance of the CNT paste emitter can be greatly improved.

Further, the evenly dispersed Ni filler material in a molten state stably fixes the CNTs inside the CNT paste. Therefore, electrical arcing does not occur during field emission. Also, the Ni filler material maintains the field electron emission source to stably operate for a long time and mechanically strongly fixes the CNT paste to the metal substrate (cathode electrode). Therefore, it is possible to suppress detachment of the CNT paste from the metal substrate during field electron emission.

Figure 6A:
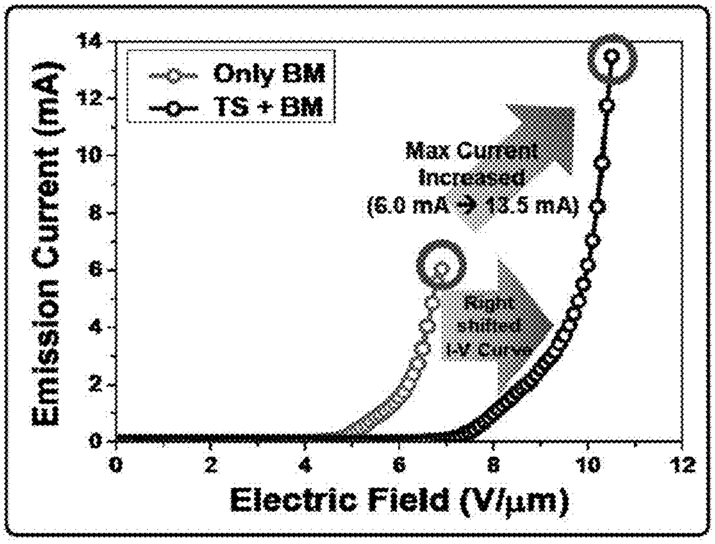
FIGS. 6A and 6B show the results of measuring field emission characteristics of the CNT paste emitter in accordance with an exemplary embodiment of the present disclosure.
Figure 6B:
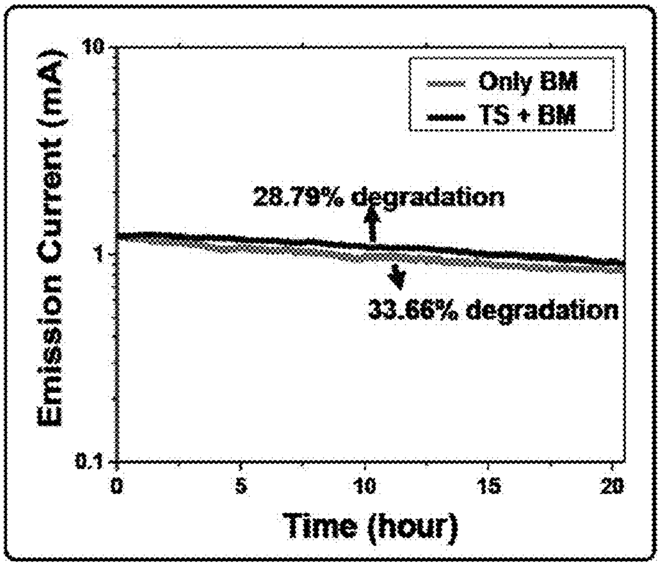

FIG. 6 shows the results of measuring field emission characteristics of the CNT paste emitter in accordance with an exemplary embodiment of the present disclosure. FIG. 6A shows a current-voltage characteristic curve (I-V curve) for comparison between a CNT paste (only BM) prepared only by means of conventional ball milling and a CNT paste (TS+BM) prepared by performing a combination of ultrasonication and ball milling according to the present disclosure and FIG. 6B shows the result of measuring long-term emission stability.

As illustrated in FIG. 6A, as a result of comparing the current-voltage characteristic curves for the conventional CNT paste (only BM) and the CNT paste (TS+BM) of the present disclosure, it was found that the maximum emission current for the CNT paste (TS+BM) of the present disclosure increased from 6.0 mA to 13.5 mA and the I-V curve for the CNT paste (TS+BM) of the present disclosure shifted to the right. Also, as illustrated in FIG. 6B, the degradation rate of the emission current values for the emitter decreased from 33.66% to 28.79%, indicating that the long-term emission stability was improved.

Figure 7:
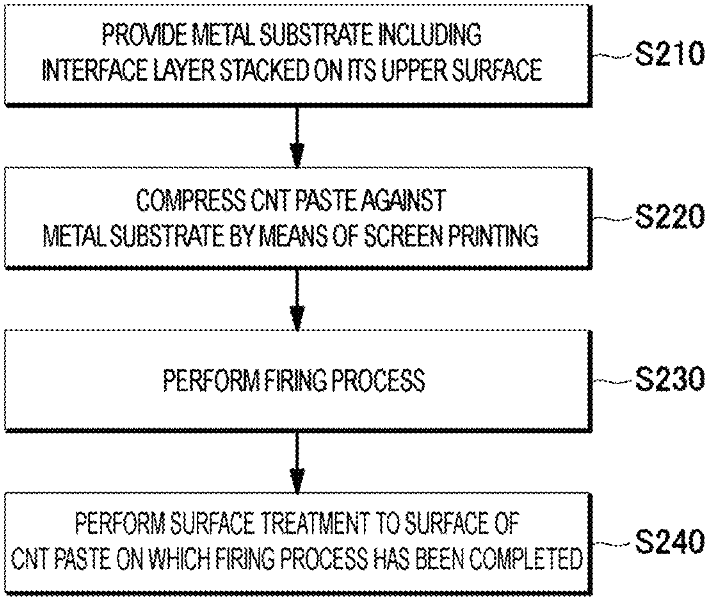
FIG. 7 is a flowchart provided to explain a method of manufacturing the CNT paste emitter in accordance with an exemplary embodiment of the present disclosure.

FIG. 7 is a flowchart provided to explain a method of manufacturing the CNT paste emitter in accordance with an exemplary embodiment of the present disclosure.

Referring to FIG. 7, a method for manufacturing the CNT paste emitter of the present disclosure includes a process (S210) of providing a metal substrate including an interface layer stacked on its upper surface, a process (S220) of compressing a CNT paste against the metal substrate by means of screen printing, a process (S230) of performing a firing process, and a process (S240) of performing a surface treatment to a surface of the CNT paste on which the firing process has been completed.

For example, in the process S210, the interface layer 120 may be stacked on the upper surface of the substrate 110. A specific method of stacking the interface layer 120 made of graphene or a graphite thin film will be described later with reference to FIG. 9.

In the process S220, the CNT paste may be applied on the substrate 110 including the interface layer 120 on its upper surface by means of screen printing. For example, a screen printing device is composed of a fixing plate, a mask holder and a rubber squeegee. In the screen printing process, the substrate 110 is fixed to the fixing plate, and then a mask having a desired pattern is fixed at a desired position on the substrate 110 by the mask holder. After the prepared CNT paste is placed on the fixed mask, the CNT paste is repeatedly compressed with the squeegee. Then, the CNT paste may be applied on the substrate 110 in the same shape as the mask pattern. That is, the CNT paste emitter 130 illustrated in FIG. 1A and FIG. 1B may have a shape corresponding to the mask having a pattern of single type or array type. Therefore, in the screen printing process, the size and number of patterns may be adjusted by using the mask, and the single type or array type CNT paste may be applied on the substrate 110.

In that case, the CNT paste emitter 130 may have a circular or rod shape. For example, the CNT paste emitter 130 may be formed into a circular or rod-shaped thin film and arranged in a single type or an array type. For example, the CNT paste emitter 130 may be formed into a circular shape having a diameter of several hundred μm to several mm or a rod shape having a width of 100 μm to 500 μm and a length of 1 mm to 20 mm.

In the process S230, after the CNT paste is applied on the substrate 110, a first firing process (90° C., 30 minutes→130° C., 30 minutes→370° C., 90 minutes) may be performed in an atmospheric atmosphere and a second firing process (810° C., 30 minutes) may be performed in a vacuum atmosphere of $10^{-5}$ torr or less. For example, in the process S230, the Ni nanoparticles in the CNT paste are put into a molten state by the firing process (heat treatment). Accordingly, some of the Ni nanoparticles in the molten state may increase the adhesion (adhesion between among the first CNT powder, the graphite nanoparticles, the SiC nanoparticles and the Ni nanoparticles) inside the CNT paste. Further, some of the Ni nanoparticles in the molten state are moved between the CNT paste and the interface layer 120 of the substrate 110. Thereafter, when the temperature decreases after the heat treatment is finished, the Ni nanoparticles melted at the interface layer 120 are hardened again. Thus, a strong mechanical adhesion and a low electrical contact resistance may be formed between the CNT paste and the substrate 110.

In the process S230, after the firing process in the vacuum atmosphere is completed, the surface treatment of grinding and activating the surface of the CNT paste using a 3M tape and sand paper may be performed. In the surface treatment, the surface of the CNT paste is uniformly flattened and the lengths of the CNTs exposed in the vertical direction from the surface of the CNT paste are made uniform. Therefore, the performance of the CNT paste emitter can be improved.

Further, according to the present disclosure, the interface layer 120 made of graphene is placed between the CNT paste emitter 130 and the substrate 110 serving as the cathode electrode, and, thus, an electrical contact resistance between the substrate 110 and the CNT paste emitter 130 can be greatly reduced. That is, a rapid movement of electrons may be caused by quantum mechanical tunneling between the substrate 110 and the interface layer 120 and the interface layer 120 and the CNT paste emitter 130 have no difference in work function, which enables a smooth movement of electrons from the interface layer 120 to the CNT paste emitter 130. Therefore, compared with a case where the interface layer 120 does not exist, an electrical contact resistance value between the substrate 110 and the CNT paste emitter 130 is significantly reduced. Therefore, the value of current emitted from the CNT paste emitter 130 is greatly increased. As a result, an electrical contact resistance of the cathode electrode 10 composed of the CNT paste emitter 130 and the interface layer 120 and disposed on the substrate 110 is greatly reduced, and, thus, an operating voltage required for field electron emission is lowered. Also, the value of field electron emission current is greatly increased.

Figure 8A:
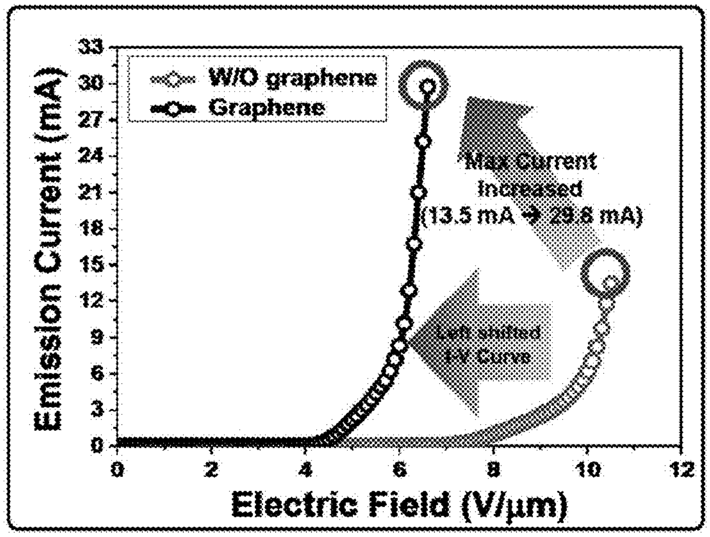
FIGS. 8A and 8B show the results of measuring field emission characteristics of the CNT paste emitter in accordance with an exemplary embodiment of the present disclosure.
Figure 8B:
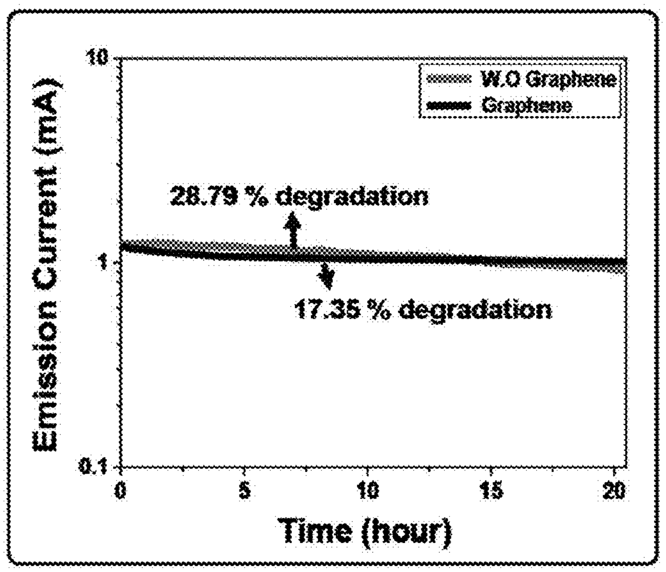

FIG. 8 shows the results of measuring field emission characteristics of the CNT paste emitter in accordance with an exemplary embodiment of the present disclosure. FIG. 8A shows a current-voltage characteristic curve (I-V curve) for comparison between a CNT paste emitter (W/O graphene) without applying an interface layer to a CNT paste prepared according to the present disclosure and a CNT paste emitter (Graphene) in which an interface layer is inserted and FIG. 8B shows the result of measuring long-term emission stability.

As illustrated in FIG. 8A, as a result of measuring and comparing emission current values depending on the presence or absence of the interface layer (graphene), in a case where the interface layer was inserted, the maximum emission current for the CNT paste emitter increased from 13.5 mA to 29.8 mA. Also, as illustrated in FIG. 8B, in a case where the interface layer was inserted, the degradation rate of the emission current values for the CNT paste emitter decreased from 28.79% to 17.35%, indicating that the long-term emission stability of the CNT paste emitter was improved.

Figure 9:
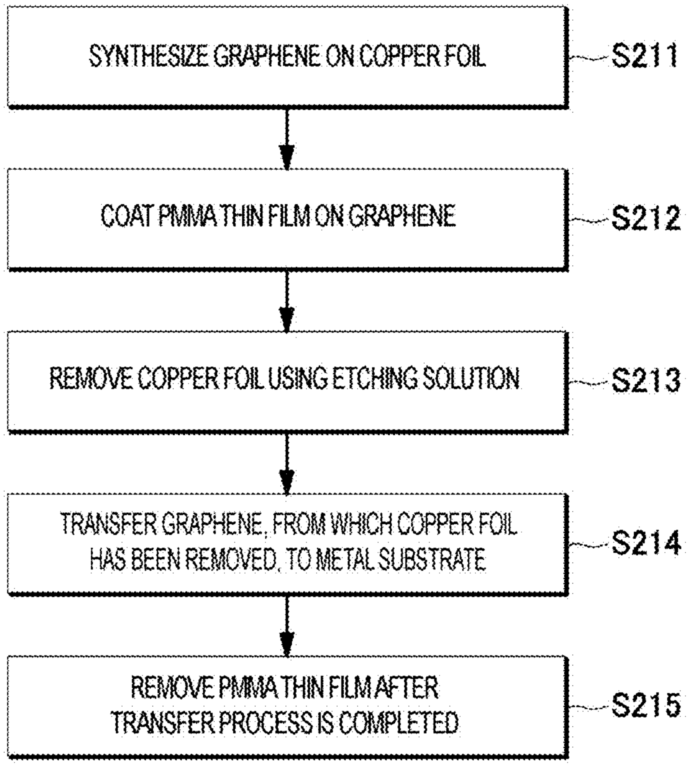
FIG. 9 is a flowchart provided to explain a process of stacking a graphene thin film on a metal or graphite substrate when the CNT paste emitter is manufactured in accordance with an exemplary embodiment of the present disclosure.

FIG. 9 is a flowchart provided to explain a process of stacking a graphene thin film on a metal or graphite substrate when the CNT paste emitter is manufactured in accordance with an exemplary embodiment of the present disclosure.

Referring to FIG. 9, specifically, the process S210 includes a process (S211) of synthesizing graphene on a copper foil by means of CVD, a process (S212) of coating a PMMA thin film on the graphene, a process (S213) of removing the copper foil using an etching solution, a process (S214) of transferring the graphene, from which the copper foil has been removed, to the metal substrate, and a process (S215) of removing the PMMA thin film after the transfer process is completed.

For example, in the process S211, the copper foil having a thickness of several hundred nm to several μm is washed with acetone and isopropyl alcohol (IPA). Thereafter, the copper foil is placed in a quartz tube and an argon (Ar) gas is allowed to flow through the quartz tube to increase the temperature of the quartz tube to 1,000° C. When the temperature of the quartz tube reaches 1,000° C., a carrier gas ($H_2$) and a reactant gas ($CH_4$) are allowed to flow through the quartz tube to synthesize graphene on the copper foil. When the graphene is synthesized, carbon (C) atoms in the $CH_4$ gas are thermally decomposed at a high temperature and some of them are absorbed by the copper foil. Copper has a low carbon solubility of about 0.04% at 1,000° C., and, thus, only a small amount of carbon can be dissolved. The $CH_4$ gas is allowed to flow through the quartz tube at 1,000° C. for about 30 minutes to supply the maximum amount of carbon to the copper foil, and then the temperature is rapidly lowered. Thus, supersaturated carbon atoms dissolved in the copper foil are pushed out of the copper foil while forming a hexagonal structure. As a result, the graphene is formed. When the graphene is synthesized, reaction conditions (temperature, $CH_4$ gas flow rate, and the like) can be regulated to synthesize one or more layers of graphene on the copper foil.

In the process S212, a PMMA thin film is formed on the graphene. First, a PMMA solution is dropped on the graphene, and then spin coating (2,000 rpm, 20 sec) is performed to uniformly apply the PMMA solution on the graphene. The PMMA solution used herein is composed of PMMA particles and a chloroform solvent or an acetone solvent. After the spin coating is finished, the copper foil coated with PMMA is dried in an oven at 85° C. for 40 minutes to remove the chloroform solvent or the acetone solvent. After the drying is finished, a uniform PMMA thin film is formed on the graphene. The PMMA thin film serves to fix the graphene so that the graphene does not bend or tear during the graphene transfer process.

In the process S213, the copper foil on which the graphene has been synthesized is immersed in a copper etching solution (Copper Etch 49-1, Transene Company, Inc.) for about 6 hours in order to remove the copper foil. Subsequently, after about 6 hours, when the copper foil is completely removed, the graphene is washed several times by using distilled water to completely remove the copper etching solution and foreign substances.

In the process S214, after the foreign substances are removed, the graphene from which the copper foil has been removed may be transferred to an upper portion of the substrate 110. For example, as illustrated in FIG. 3, the graphene may be transferred to upper portions of various types of metal rods or metal substrates 110 for application to the cathode electrode 10.

In the process S215, after the graphene is transferred onto the substrate 110, the PMMA thin film present on the graphene is removed. For example, in the PMMA removal process, a wet method in which acetone is allowed to flow onto the PMMA thin film for 10 minutes may be used in combination with a dry method in which the PMMA thin film is removed by means of heat treatment (atmospheric atmosphere, 370° C., 60 minutes). In the PMMA removal process, the wet and dry methods are used together to minimize damage to the graphene. For example, acetone effectively removes the PMMA, but damages the graphene. On the other hand, the heat treatment has low PMMA removal efficiency, but hardly damages the graphene. Therefore, after most of the PMMA is firstly removed by using acetone, the heat treatment is secondarily performed to remove some PMMA remaining on a surface of the graphene. Accordingly, it is possible to minimize damage to the graphene.

Figure 10A:
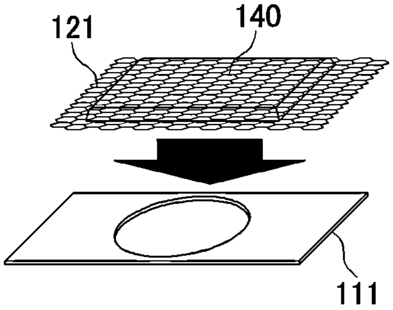
FIGS. 10A and 10B illustrate a process of stacking graphene on a metal or graphite substrate for application to a gate electrode of an X-ray tube apparatus in accordance with an exemplary embodiment of the present disclosure.
Figure 10B:
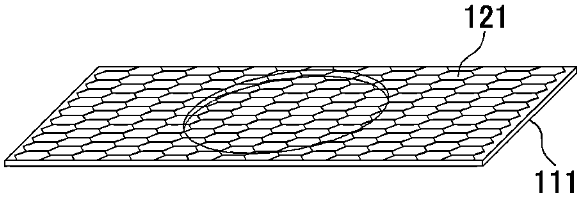

FIG. 10 illustrates a process of stacking graphene on a metal or graphite substrate for application to a gate electrode of an X-ray tube apparatus in accordance with an exemplary embodiment of the present disclosure. FIG. 10A illustrates a process of transferring graphene coated with a PMMA thin film to a metal substrate having a hole and FIG. 10B shows a state where the PMMA thin film has been removed and only the graphene remains on the metal substrate.

As another example, referring to FIG. 10A and FIG. 10B, after the processes S211 to S213 are performed, the graphene 121 coated with a PMMA thin film 140 may be transferred to the upper portion or a lower portion of the metal or graphite substrate 110 having a hole for application to the gate electrode 20 in the process S214. Then, the PMMA thin film 140 may be removed in the process S215.

Meanwhile, graphene has one or more atomic layers of carbon atoms. Each carbon atom in graphene shares a strong sp2 bond to form a nanoscale hexagonal mesh. Further, graphene has excellent electrical conductivity and thermal conductivity, and has very excellent mechanical strength and elasticity. If graphene is used for a gate electrode based on these characteristics, a very uniform electric field distribution can be obtained and a high electron beam transmittance can be obtained. Also, since thermal energy generated when electrons collide with the graphene is easily released, it is possible to suppress damage or deformation of the gate electrode. Therefore, if graphene is used for a gate electrode, it is possible to achieve a higher electron beam transmittance, a uniform electron beam distribution and a reduction in thermal damage to the gate electrode compared with a conventional metal gate electrode. As a result, it is possible to implement an X-ray tube which can be stably operated even under high voltage and high current conditions.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An X-ray tube apparatus using a CNT paste emitter, comprising:

a cathode electrode coupled to the CNT paste emitter;

a gate electrode disposed above the cathode electrode, having a hole greater in size than the CNT paste emitter and coupled to a first graphene film on its lower or upper surface;

a focusing lens disposed above the gate electrode;

an anode electrode disposed above the focusing lens to face the cathode electrode; and a tube housing surrounding the cathode electrode, the gate electrode, the focusing lens and the anode electrode, wherein the cathode electrode comprises:

the CNT paste emitter disposed on a metal or graphite substrate; and an interface layer inserted between the metal or graphite substrate and the CNT paste emitter, and wherein the interface layer is comprises a second graphene film or a graphite film.

2. The X-ray tube apparatus of claim 1, wherein the CNT paste emitter comprises second CNT powder and a graphite binder, and wherein the second CNT powder includes first CNT powder, graphite nanoparticles, SiC nanoparticles and Ni nanoparticles.

3. The X-ray tube apparatus of claim 2, wherein the second CNT powder further comprises $SiO_2$ nanoparticles and $TiO_2$ nanoparticles.

4. The X-ray tube apparatus of claim 1, wherein the focusing lens has an elliptical structure.

* * * * *